(12) United States Patent
Strauser et al.

(10) Patent No.: US 6,870,722 B2
(45) Date of Patent: *Mar. 22, 2005

(54) ENHANCED SPUR CABLE CIRCUIT PROTECTION DEVICE AND METHOD FOR ITS IMPLEMENTATION

(75) Inventors: Michael Strauser, Gaston, OR (US); Maris Graube, Forest Grove, OR (US); Dana Lommen, Forest Grove, OR (US)

(73) Assignee: Relcom, Inc., Forest Grove, OR (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/295,235

(22) Filed: Nov. 14, 2002

(65) Prior Publication Data

US 2003/0131293 A1 Jul. 10, 2003

Related U.S. Application Data

(63) Continuation-in-part of application No. 09/866,187, filed on May 24, 2001, now Pat. No. 6,519,125, which is a continuation of application No. 09/771,152, filed on Jan. 26, 2001, now Pat. No. 6,369,997, which is a continuation of application No. 09/344,408, filed on Jun. 24, 1999, now Pat. No. 6,366,437.
(60) Provisional application No. 60/418,908, filed on Oct. 14, 2002.

(51) Int. Cl.[7] .............................................. H02H 9/08
(52) U.S. Cl. ................................................ 361/93.9
(58) Field of Search ............................ 361/93.9, 62, 63, 361/64, 65, 93.1, 91.1

(56) References Cited

U.S. PATENT DOCUMENTS 3,309,542 A    3/1967   Elliot
3,521,087 A    7/1970   Lombardi
3,571,608 A    3/1971   Hurd
4,420,840 A   12/1983   Livermore
4,475,012 A   10/1984   Coulmance
4,724,502 A    2/1988   Kawahira et al.
4,740,859 A    4/1988   Little
4,814,932 A    3/1989   Morelli
5,014,156 A    5/1991   Bruch et al.
5,052,935 A   10/1991   James et al.
5,117,219 A *  5/1992   Tice et al. .................. 340/518
5,144,517 A    9/1992   Wieth
5,337,208 A    8/1994   Hossner
5,415,564 A    5/1995   Winter et al.
5,581,801 A   12/1996   Spriester et al.
5,706,157 A    1/1998   Galecki et al.
5,757,603 A    5/1998   Kapp et al.
5,781,844 A    7/1998   Spriester et al.
6,366,437 B1   4/2002   Graube
6,519,125 B2   2/2003   Graube

\* cited by examiner

Primary Examiner—Brian Sircus
Assistant Examiner—James A Demakis
(74) Attorney, Agent, or Firm—Chernoff, Vilhauer, McClung & Stenzel, LLP (57) ABSTRACT

The circuit of the invention provides protection for both a spur circuit and the network while allowing other spurs on the network to continue operation and is applicable to any type of fieldbus network including both FF and ASi type networks. A control circuit monitors a current limiter coupled to each spur circuit. If the spur circuit goes into an overcurrent condition for a preset period of time, the control circuit turns it off. After a second period of time has elapsed, the control circuit turns the current limiter back on permitting current to flow in the spur once again while continuing to monitor the current limiter.

12 Claims, 6 Drawing Sheets

ENHANCED SPUR CABLE CIRCUIT PROTECTION DEVICE AND METHOD FOR ITS IMPLEMENTATION

CROSS-REFERENCES TO RELATED APPLICATIONS

This application is a continuation in part of U.S. patent application Ser. No. 09/866,187 filed May 24, 2001, now U.S. Pat. No. 6,519,125, which is a continuation of U.S. patent application Ser. No. 09/771,152 filed Jan. 26, 2001, now U.S. Pat. No. 6,369,997, which is a continuation of U.S. patent application Ser. No. 09/344,408 filed Jun. 24, 1999, now U.S. Pat. No. 6,366,437.

Pursuant to 35 U.S.C. 119, applicant claims priority for this application based upon U.S. provisional application Ser. No. 60/418,908 filed Oct. 14, 2002.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to a fieldbus network and, more particularly, to a current limiter to protect a fieldbus network from an electrical short in a spur cable or a device attached to a spur cable.

In a typical industrial plant application, sensors measure position, motion, pressure, temperature, flow, and other parameters related to the operation of process machinery and activities. Actuators, such as valves and motor controllers, control the operation of the machinery and process activities. The sensors and actuators are remotely located from the human and computerized controllers which gather information from the sensors and direct operation of the actuators. A communication network links the controllers with the sensors and actuators located in the field.

Heretofore, communication between controllers, remote sensors, and actuators in industrial applications has been by means of analog signaling. The prevailing standard for analog networking of field devices and the control room in industrial applications has been the Instrument Society of America standard, ISA S50.1. This ISA standard provides for a two-wire connection between the controller and each field device. One wire of the system carries the analog signal between the remote device and the controller. The analog signal may be converted to a digital signal useful to a computerized controller. The second wire of the circuit supplies DC power for operation of the remote sensor or actuator. Both wires provide return paths for data and power respectively Communication utilizing digital signaling reduces the susceptibility of the communication system to noise and provides a capability for conveying a wide range of information over the communication network. Digital communication also permits several different devices to communicate over a single pair of wires. Remote devices used in connection with a digital communication system typically incorporate local "intelligence." This permits sensors and actuators to perform diagnostic, control, and maintenance functions locally. Further, the local intelligence permits the devices to communicate directly with each other and perform some functions without the necessity of involving a central control facility, thus promoting the development of distributed control systems.

Fieldbus is a generic term used to describe a digital, bidirectional, multidrop, serial communication network for connecting isolated field devices, such as controllers, actuators and sensors, in industrial applications. One such fieldbus called Foundation Fieldbus or "FF" is defined by the Instrument Society of America standard, ISA SP50.02. This system utilizes a two-wire bus to provide simultaneous digital communication and DC power to remotely located devices.

A current limiter is disclosed in U.S. Pat. No. 6,366,437 which is assigned to the same assignee, the contents of which are incorporated herein by reference. The protection circuit of the '437 patent minimizes the impact of short circuits on a fieldbus network. It does this by limiting the current that is supplied from the home run cable to the spur cables and connected devices. Any short or overcurrent condition on the spur cable results in the failure of any devices on that spur but the rest of the spurs, with their associated devices and the network, continue to operate normally as long as there is sufficient current for the trip point on the protection circuit.

Another device network called AS-interface, or ASi, is similar to FF but ASi devices use substantially more current. To raise the current trip point limit on a circuit such as disclosed in U.S. Pat. No. 6,366,437, could cause the circuitry to overheat and self-destruct during a sustained short circuit because of the amount of power available on the network. Moreover, on some FF networks, especially those used for intrinsically safe installations, the available power is limited in order to prevent a spark from causing an explosion in the hazardous area. In such a case, the difference between the power the device on the spur uses and the protection circuit trip point current is more than is available on the segment. A short on the spur in this situation would not prevent failure of the entire segment.

BRIEF SUMMARY OF THE INVENTION

The circuit of the invention provides protection for both a spur circuit and the network while allowing other spurs on the network to continue operation and is applicable to both FF and ASi type networks as well as any other type of data and power network. A control circuit monitors a current limiter coupled to each spur circuit. If the spur circuit goes into an overcurrent condition for a preset period of time, the control circuit turns it off. After a second period of time has elapsed, the control circuit turns the current limiter back on permitting current to flow in the spur once again while continuing to monitor the current limiter.

DETAILED DESCRIPTION OF THE INVENTION

Figure 1:
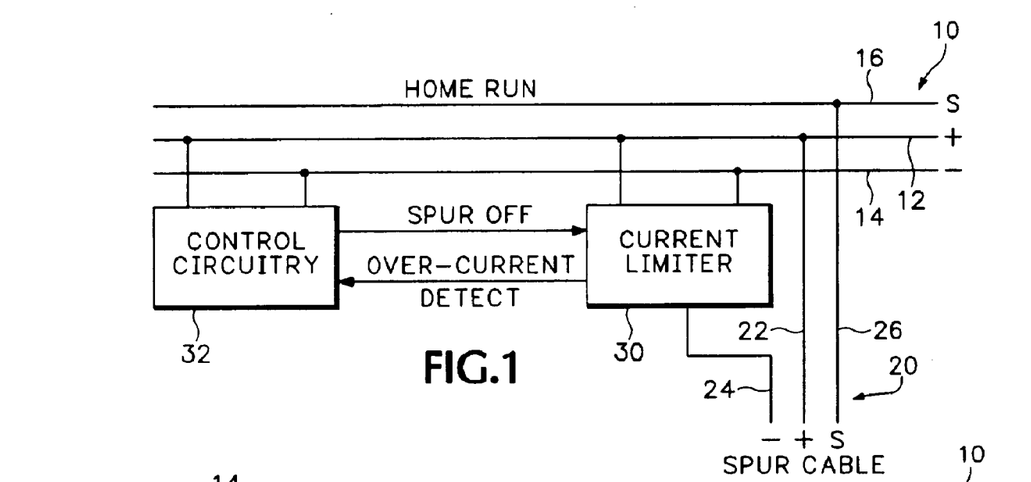
FIG. 1 is a block schematic diagram of a protection circuit for a fieldbus network of either FF or ASi type and spur circuit.

Referring to FIG. 1, a fieldbus network includes a "home run" cable or trunk line 10 which comprises a positive lead 12, a negative lead 14 and a shield 16. Connected to the home run network 10 are one or more spur cables 20. Each spur cable includes a positive line 22, a negative line 24 and a shield 26.

The home run 10 is a trunk line of the conventional type described above, that is, it is either an ASi network or a foundation fieldbus network or some similar network. As such, the positive and negative wires 12 and 14 carry both power and data. Coupled in parallel with the home run 10 and the spur cable 20 is a protection circuit which includes a current limiter 30 coupled to control circuitry 32. In FIG. 1, the current limiter 30 is coupled in-line with the negative lead 24 of the spur cable 20. In the event of an overcurrent condition that persists for a first time period, the current limiter 30 turns off current in the spur cable 20 thus serving as a protection circuit for the home run 10 and all of the other spurs and devices connected to it. The current limiter is controlled by control circuitry 32 which both detects the overcurrent condition and turns the spur 20 on and off. Control circuit 32 turns the spur 20 back on after a second predetermined period of time to retest for the short circuit condition.

Figure 2:
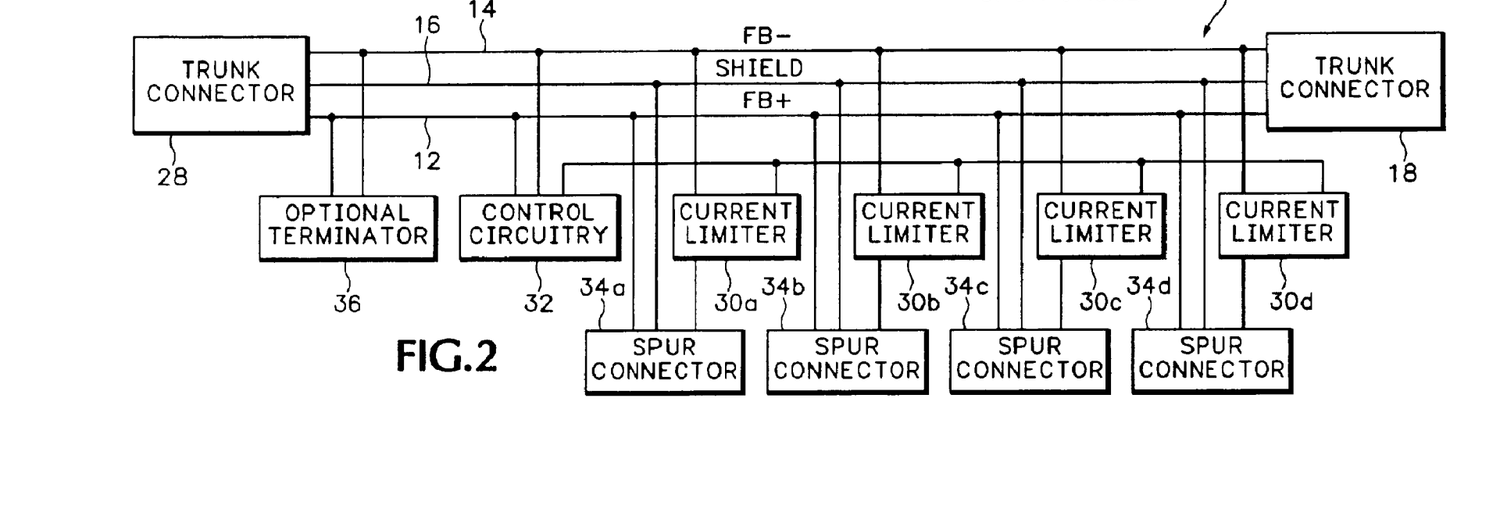
FIG. 2 is a block schematic diagram of a typical four-port connection block coupling four spur lines to a fieldbus trunk line.

The network is shown in more detail in FIG. 2 in which a block of spur connections 34a through 34d are connected to the fieldbus trunk line 10. Four connections have been shown but this is for illustration purposes only. Any practical number of spurs may be used in such a block. The home run network 10 extends between a pair of trunk connectors 18 and 28. The block of FIG. 2 includes an optional terminator circuit 36. Each of the spur connectors 34a through 34d have current limiter circuits 30a through 30d coupled respectively to the negative line 12 of the fieldbus network 10. All four of the current limiter circuits 30a through 30d are controlled by control circuitry 32.

Figure 3:
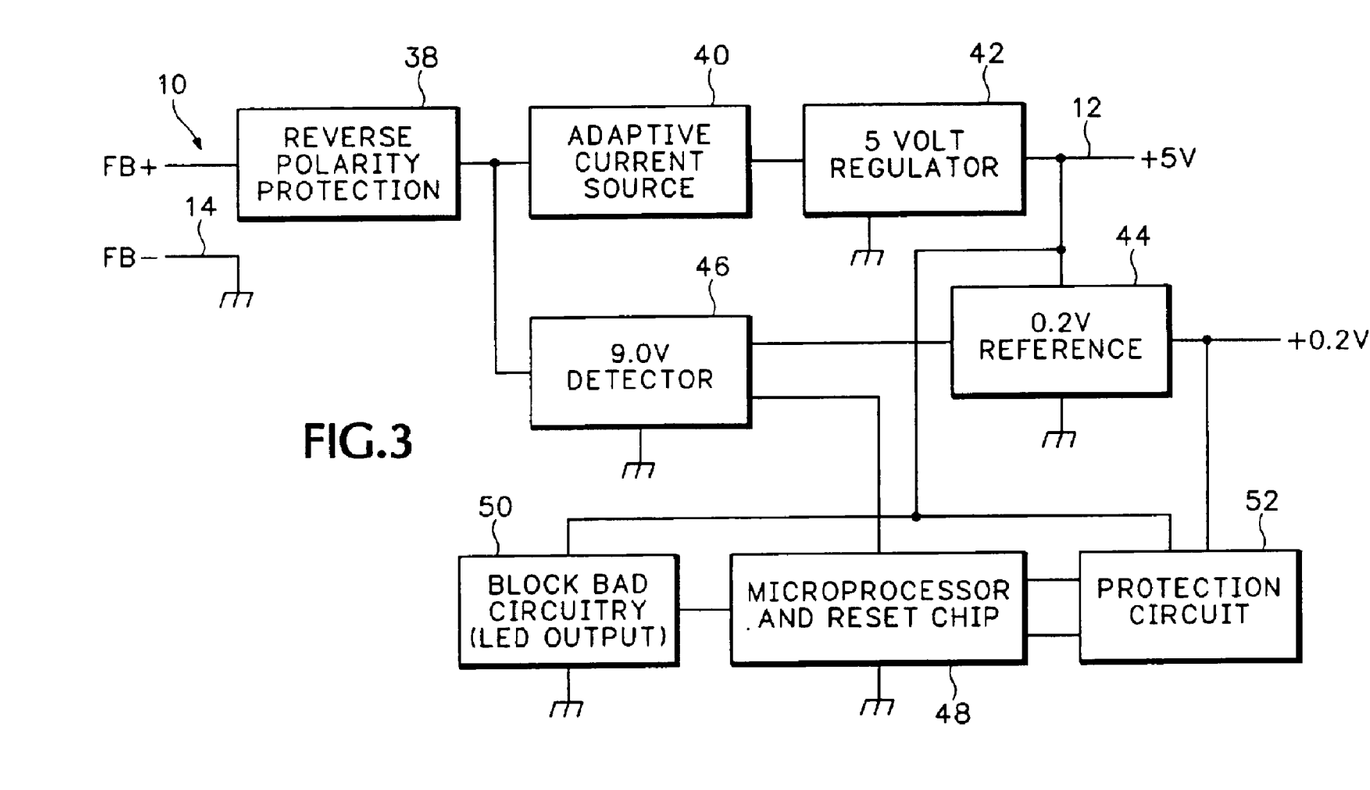
FIG. 3 is an expanded block schematic diagram of the power supply and control block of FIG. 2.

FIG. 3 shows in more detail functional aspects of control circuitry 32 and current limiter 30. A reverse polarity protection block 38 prevents current from flowing in the wrong direction which would otherwise damage internal circuitry connected to the fieldbus network 10. The polarity protection circuit 38 is coupled to an adaptive current source circuit 40 which provides the necessary power to the internal circuitry of the control circuitry block 32 and the current limiter 30 while at the same time maintaining a high impedance to the fieldbus 10. The high impedance connection permits the protection circuitry to operate without adversely affecting the data on the rest of the trunk line 10. A 5.0-volt regulator circuit 42 is coupled to the positive lead 12 of the fieldbus. This regulates the voltage for semiconductor devices in control circuitry 32 and current limiter 30. The 0.2-volt reference block 44 develops a voltage which is used by the current limiter circuit 30. The 9.0-volt detector circuit 46 detects the presence of the incoming bus voltage and determines whether it is above 9.0 volts. If the bus voltage is above this value, the microprocessor and reset chip 48 turns on an LED (not shown) indicating that power on the fieldbus trunk line 10 is normal. Should the microprocessor and reset chip 48 fail to power up properly, bad block circuitry 50 is turned on. This circuit drives an LED that indicates that the entire block (shown generally in FIG. 2) is not functioning properly. The microprocessor and reset chip 48 drives a protection circuit 52. This block may be constructed along the lines of the current limiter circuits 30 such as a set of four current limiter circuits 30a through 30d as shown in FIG. 2.

Figure 4:
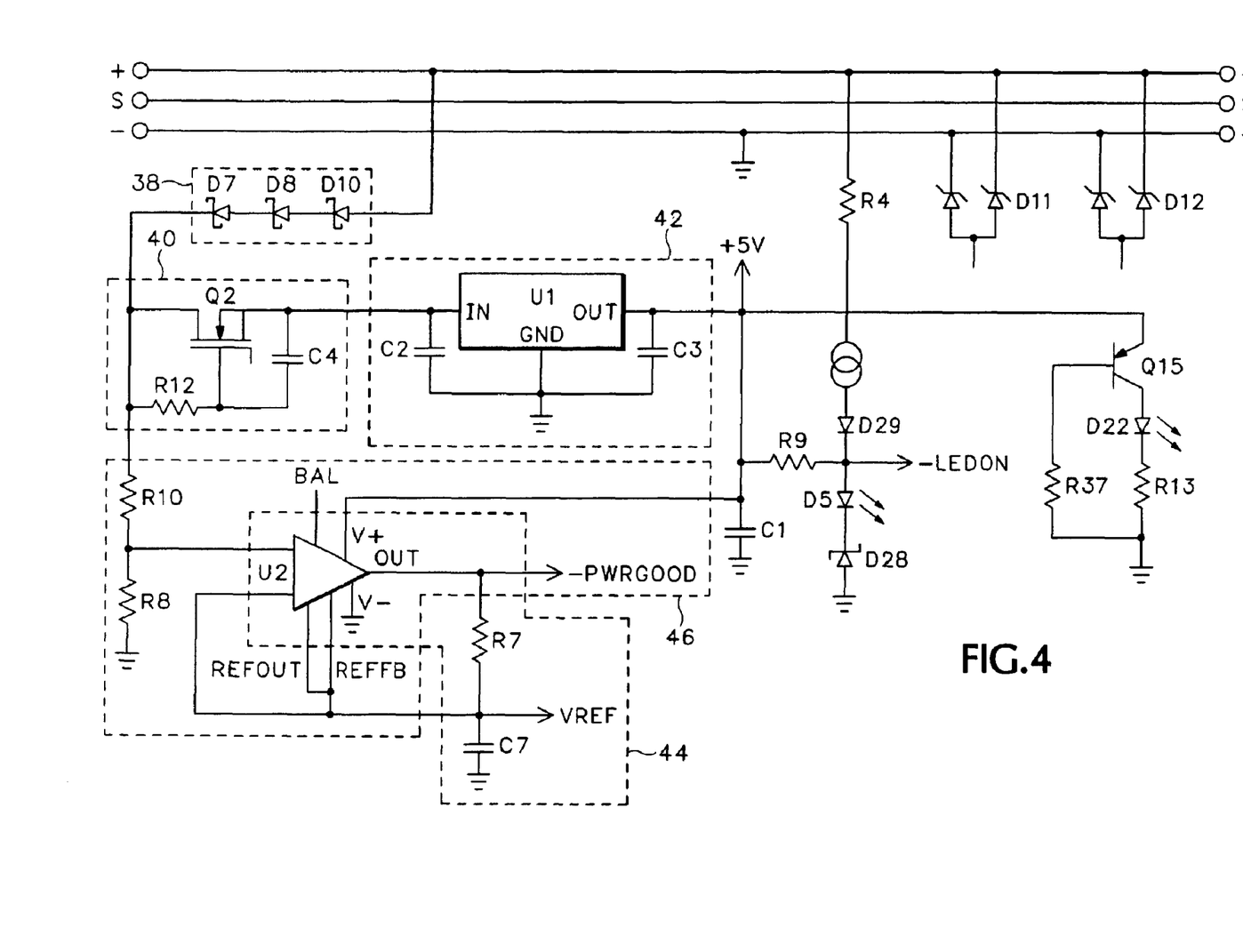
FIG. 4 is a schematic diagram of the control circuit block of FIG. 1.

Referring to FIG. 4, which shows the operational circuit details of FIG. 3, reverse voltage protection is provided by diodes D7, D8 and D10. Three diodes are necessary instead of one in order to meet certain hazardous location certification requirements which require double fault survival. An adaptive current source comprises Q2, R12 and C4. Resistor R12 and capacitor C4 form a time constant. The gate of Q2 charges up to a point where enough current is being fed to the internal circuitry. This time constant is relatively long and the gate voltage does not change when a fieldbus signal reaches the device. This network thus makes this device look like a high impedance at fieldbus frequencies. U1, C1, C2 and C3 regulate a 5.0-volt supply for the internal circuitry. Resistors R8 and R10 form a voltage divider from the input bus voltage. This feeds a comparator U2 whose output indicates whether the bus voltage is above 9.0 volts. This signal is then fed to the microprocessor U4 (FIG. 6) via the line -PWRGOOD. Resistor R7 provides an amount of positive feedback for hysteresis. Amplifier U2 also generates the 0.2-volt reference that is used for this comparison. C7 is a filter for the 0.2-volt reference. The circuit formed by R4, D29 and D28 along with LED D5, is optional. This optional circuit is provided in applications in which the current limiter circuitry described herein is not used. The purpose of this circuit is to indicate the presence of power on the trunk line by causing LED D5 to light. When current limiter circuitry is used, bus power is indicated by the combination of R9 and D5 and the microprocessor. Diodes D11 and D12 are 36-volt TVS diodes which protect the internal circuitry from electrostatic discharges.

Transistor Q15, resistor R37, diode D22 and resistor R13 form a network that indicates that the microprocessor is working on power-up. The network briefly turns on LED D22 but after the microprocessor boots up, Q15 is turned off.

Figure 5:
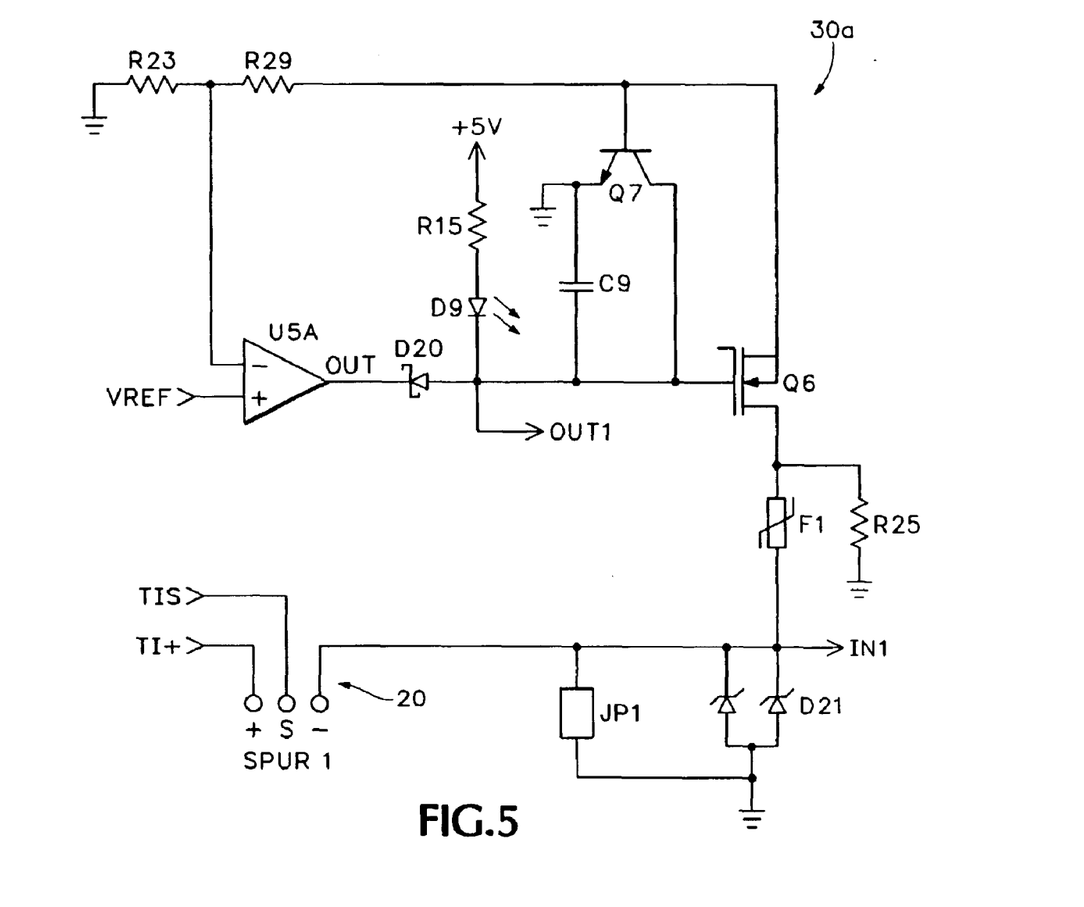
FIG. 5 is a detailed schematic diagram of a typical current limiter circuit.

Referring to FIG. 5, a current limiter network corresponding generally to the current limiter block 30 of FIG. 1 is shown in which a transistor Q6 limits the amount of current flowing through a spur cable 20. The negative wire 14 of the trunk cable is connected to a diode D21 which is a TVS diode to protect the circuit from electronic static discharge. F1 is a protection fuse that is set relatively high so that it will not fuse open unless there is a catastrophic failure within the apparatus. R25 is a charging resistor which allows current to bypass the protection circuitry when it has been turned off by the control circuitry 32. The transistor Q6 is a MOSFET which varies its impedance in response to an overcurrent condition. When the current is under the current limit however, its impedance is near zero. Resistor R15 provides voltage to the gate of Q6 to turn it on. D9 is an LED that will be on if the current limiter 30 is in current limit or if the microprocessor turns it off. D20 is a diode that isolates the output of the operational amplifier U5A from the microprocessor output. R23 is the current sense resistor. The voltage developed across this resistor is coupled to the input of operational amplifier U5A. Resistor R29 and transistor Q7 are used to improve the response time of the current limiter circuit 30. Capacitor C9 is a filter capacitor to eliminate circuit oscillation.

Normally, MOSFET transistor Q6 is fully on and current within an acceptable range flows to the spur circuit 20. If a short occurs on the spur however, current rapidly increases to the point at which the voltage across R23 and R29 increases, thus turning Q7 on. When Q7 turns on, the voltage on the gate of Q6 decreases which raises its source-drain impedance. As the impedance between the source and drain of Q6 rises, current in the spur decreases. The voltage across R23 exceeds the reference voltage VREF but it takes some time for the operational amplifier U5A to react to this condition. When it finally reacts, it adjusts the impedance of Q6 such that the voltage across R23 is the same as the reference voltage. When this occurs, the voltage at the base of Q7 is too low to turn it on and it no longer has an effect. The voltage at the gate of Q6 will be less than 2.0 volts so the diode D9 turns on. The voltage at IN1 will be near the bus voltage which is high enough to signal the microprocessor that the current limiter is in current limit. Once the microprocessor has seen the current limiter at its limit for a predetermined "trip time," it drives OUT1 low (refer to FIG. 6). This action turns off Q6 completely. At this point, the only current flowing to the spur circuit 20 comes from R25. After another predetermined time, the "reset time," the microprocessor allows OUT1 to go "high," resetting Q6 and turning it on. If the short circuit still exists however, the process described above will repeat and Q6 will shut down; otherwise, Q6 turns fully on again and the spur circuit 20 operates as normal.

Figure 6:
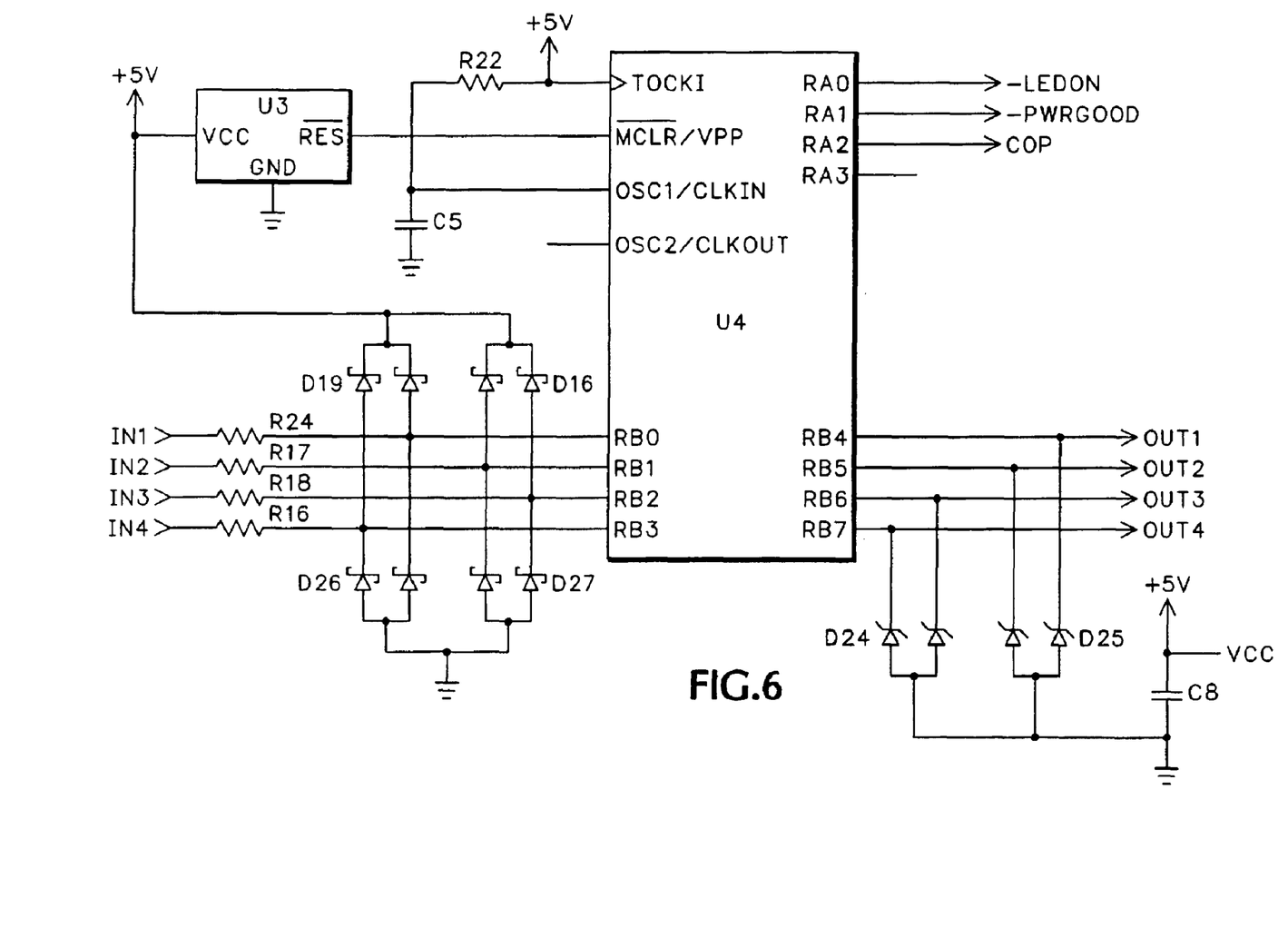
FIG. 6 is a detailed schematic diagram of a microprocessor circuit as used in the control circuitry block of FIG. 1.

Referring to FIG. 6, U4 is a microprocessor that operates four current limiter circuits 30a through 30d. R22 and C5 set the frequency for the RC oscillator in the microprocessor. U3 is a microprocessor supervisor. It insures that the microprocessor is held in reset when there are low voltage conditions. R16, R17, R18 and R24 limit the current that can flow from each of the spurs 34a through 34d to the microprocessor U4. These lines (IN1 through IN4) indicate if one of the four current limiters 30a through 30d is in current limit. D16, D19, D26 and D27 provide voltage clamping on the input lines (IN1 through IN4) to prevent voltages that may be damaging from reaching the microprocessor U4. D24 and D25 are TVS diodes that protect the microprocessor U4 from surge voltages on lines OUT1 through OUT4. These lines connect to the respective gates on each of the current limiter MOSFETs (such as Q6).

Figure 7:
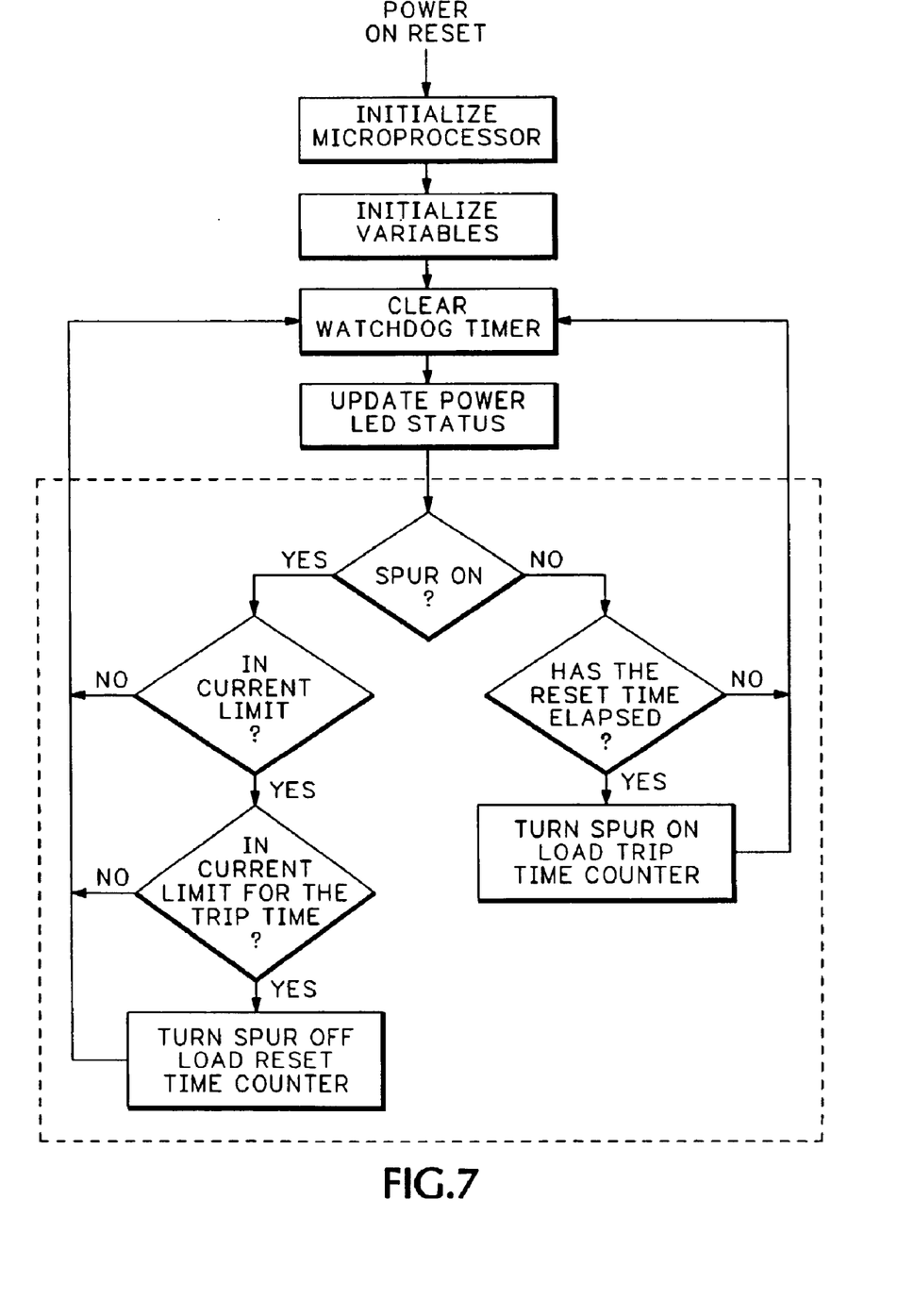
FIG. 7 is a flowchart diagram illustrating the operation of the microprocessor circuit of FIG. 6.

Referring now to FIG. 7, the operation of the control circuitry 32 in conjunction with the current limiter 30 is shown by way of a flowchart.

Upon power up or reset, the microprocessor U4 is initialized. The microprocessor initializes variables and clears a watchdog timer. Next, the microprocessor U4 updates the status of each of the LEDs in the circuits of FIG. 4 and FIG. 5. Once power up and updating have been accomplished, the microprocessor U4 queries each of the spur circuits 34a through 34d to determine if any of the current limiters 30a through 30d are in current limit. If not in current limit, the program loops back to clear the watchdog timer but if in current limit starts another clock which runs for a predetermined "trip time" for that current limiter. If the current limiter under consideration is in current limit for the trip time, the microprocessor U4 turns the particular spur circuit off and loads a reset time counter. The reset time counter defines a second predetermined time period.

The next time the microprocessor queries the spur, if it has been turned off, it checks to see if the reset time has elapsed. If the reset time has not elapsed, the microprocessor loops back to the watchdog timer and, after a number of clock cycles, queries the current limiter again. If the reset time has elapsed, U4 turns the particular spur circuit on and reloads the trip time counter.

Also, upon power up the microprocessor turns on each spur circuit in turn with a preset time interval between each one so as to avoid a current surge through all four spur circuits 34a through 34d at once.

In the example given, the current limiter circuits 30a through 30d are connected to the negative lead of home run 10. However, the circuit can be configured to couple these circuits to the positive lead. The particular selection of polarity is not critical to the invention.

A microprocessor has been shown by way of illustration as one way of implementing the control circuitry 32, however, other hard-wired circuit elements could be used as well. The illustration disclosed in FIG. 2 contains four spur circuits monitored by a single microprocessor but more or fewer circuits could be used, if desired.

We claim:

1. A protection circuit for a fieldbus network, the network comprising a pair of conductors carrying both power and data signals and having one or more spur circuits connected to said fieldbus network, comprising:
   (a) a current limiting circuit coupled to at least one of said spur circuits for limiting current in said spur circuit when an overcurrent condition exists in said spur circuit; and,
   (b) a current monitoring and control circuit coupled to the current limiting circuit for sensing the current in the spur circuit and for providing a signal to the current limiting circuit to turn off current in the spur circuit if said overcurrent condition persists for a predetermined period of time.

2. The protection circuit of claim 1 wherein the current monitoring and control circuit includes a reset timer for triggering a signal that restores current to the spur circuit after a second period of time has elapsed if the overcurrent condition no longer exists.

3. The protection circuit of claim 2 wherein the current monitoring and control circuit is implemented in a programmed microprocessor.

4. The protection circuit of claim 1 wherein said current monitoring and control circuit resets the current limiting circuit turning it on after a reset period has expired if the overcurrent condition has stopped within the reset period.

5. The protection circuit of claim 2 further including a plurality of spur circuits and a corresponding plurality of current limiting circuits coupled thereto, respectively, and wherein said current monitoring and control circuit is coupled to each of said current limiting circuits.

6. The protection circuit of claim 5 wherein the current monitoring and control circuit is implemented in a programmed microprocessor, and said microprocessor is programmed to power up each of said plurality of spur circuits in a predetermined sequence and over predetermined time intervals.

7. The protection circuit of claim 1 wherein said current limiting circuit comprises a controllable impedance semiconductor element.

8. The protection circuit of claim 7 wherein said spur circuit comprises a positive and a negative lead and said semiconductor element is coupled in line with one of said leads of said spur circuit.

9. A method of protecting a network from an overcurrent condition in a spur circuit comprising the steps of:
   (a) providing a current sensing device in at least one spur circuit,
   (b) monitoring the current sensing device to determine if an overcurrent condition exists in the spur circuit, (c) turning off the spur circuit if said overcurrent condition persists for a first predetermined period of time, (d) after a second predetermined period of time has elapsed, turning the spur circuit on and repeating steps (b) and (c), and (e) repeating step (d).

10. The method of claim 9 including the step of providing a programmed microprocessor device to perform steps (b), (c) and (d).

11. The method of claim 10 wherein steps (b) and (c) are accomplished by periodically sampling a parameter of the current sensing device and turning off the spur circuit if said overcurrent condition exists for each sample over said predetermined period of time.

12. The method of claim 11 wherein the sampled parameter is current.

* * * * *